(12) United States Patent
Kuroda

(10) Patent No.: US 9,485,444 B2
(45) Date of Patent: Nov. 1, 2016

(54) PHOTOELECTRIC CONVERSION DEVICE HAVING CONNECTION SECTIONS CONNECTING DIFFERENT NUMBERS OF OUTPUT NODES

(71) Applicant: CANON KABUSHIKI KAISHA, Tokyo (JP)

(72) Inventor: Yukihiro Kuroda, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/270,026

(22) Filed: May 5, 2014

(65) Prior Publication Data

US 2014/0333812 A1 Nov. 13, 2014

(30) Foreign Application Priority Data

May 8, 2013 (JP) .................................. 2013-098499

(51) Int. Cl.
| | |
|---|---|
| *H04N 5/3745* | (2011.01) |
| *H04N 5/347* | (2011.01) |
| *H04N 5/343* | (2011.01) |
| *H04N 5/378* | (2011.01) |

(52) U.S. Cl.
CPC .......... *H04N 5/37457* (2013.01); *H04N 5/343* (2013.01); *H04N 5/347* (2013.01); *H04N 5/3745* (2013.01); *H04N 5/378* (2013.01)

(58) Field of Classification Search
None
See application file for complete search history.

(56) References Cited

U.S. PATENT DOCUMENTS

| | | | |
|---|---|---|---|
| 2005/0128327 A1* | 6/2005 | Bencuya et al. | 348/308 |
| 2010/0182465 A1* | 7/2010 | Okita | H04N 5/343 348/273 |
| 2011/0273597 A1* | 11/2011 | Ishiwata | 348/272 |

FOREIGN PATENT DOCUMENTS

| | | |
|---|---|---|
| JP | 2003-18465 A | 1/2003 |
| JP | 2009-33316 A | 2/2009 |

\* cited by examiner

*Primary Examiner* — Albert Cutler
(74) *Attorney, Agent, or Firm* — Canon U.S.A., Inc. IP Division

(57) ABSTRACT

A photoelectric conversion device has pixels arranged in two dimensions. The pixels have a photoelectric conversion unit and a signal reading out unit that reads out a signal generated in the photoelectric conversion unit. The photoelectric conversion device includes first and second pixel groups, and first and second connection sections. Each of the first and second pixel groups has pixels arranged in a predetermined direction. The first connection section electrically connects output nodes of the pixels included in the first pixel group to one another. The second connection section electrically connects output nodes of the pixels included in the second pixel group to one another. The number of output nodes which are electrically connected to one another by the first connection section is different from the number of output nodes which are electrically connected to one another by the second connection section.

5 Claims, 15 Drawing Sheets

PHOTOELECTRIC CONVERSION DEVICE HAVING CONNECTION SECTIONS CONNECTING DIFFERENT NUMBERS OF OUTPUT NODES

BACKGROUND OF THE INVENTION

1. Field of the Invention

One disclosed aspect of the embodiments relates to a photoelectric conversion device used in a digital still camera, a video camera, or the like.

2. Description of the Related Art

As demand for higher functionality and higher image quality for photoelectric conversion devices increases, a technique is disclosed in which, by connecting the charge-voltage conversion units in pixels to one another through switches, charges accumulated in photoelectric conversion units can be mixed (for example, see Japanese Patent Laid-Open No. 2009-33316, which is hereinafter referred to as Patent Document 1). In Patent Document 1, a technique is disclosed in which pixel signals which are not mixed are used as image capture signals in a digital still camera or a video camera and in which a mixed pixel signal is used in automatic exposure control.

In Japanese Patent Laid-Open No. 2003-18465 (hereinafter, referred to as Patent Document 2), a configuration is disclosed in which multiple pixel groups provided with switches for addition, each of which is disposed between pixels, are provided, and in which connection switches are used to add signals from the pixel groups.

Regarding the technique described in Patent Document 1, further investigation needs to be carried out from the viewpoint of reading out of signals at a faster speed. In the configuration described in Patent Document 2, the number of pixels whose signals are added in each of the columns is the same. Such a configuration makes it difficult to obtain signals in which a different number of pixels are added depending on a row.

SUMMARY OF THE INVENTION

One disclosed aspect of the embodiments provides a photoelectric conversion device which enables reading out of signals in which a different number of pixels are added depending on a row, as well as reading out of signals at a high speed.

A photoelectric conversion device in one embodiment has pixels arranged in two dimensions. The pixels have a photoelectric conversion unit and a signal reading out unit that reads out a signal generated in the photoelectric conversion unit. The photoelectric conversion device includes a first pixel group, a second pixel group, a first connection section, and a second connection section. The first pixel group has pixels arranged in a predetermined direction. The second pixel group has pixels arranged in the same direction of the predetermined direction. The first connection section electrically connects output nodes of the pixels included in the first pixel group to one another. The second connection section electrically connects output nodes of the pixels included in the second pixel group to one another. The number of output nodes which are electrically connected to one another by the first connection section is different from the number of output nodes which are electrically connected to one another by the second connection section.

Further features of the disclosure will become apparent from the following description of exemplary embodiments with reference to the attached drawings.

DESCRIPTION OF THE EMBODIMENTS

First Embodiment

Figure 1:
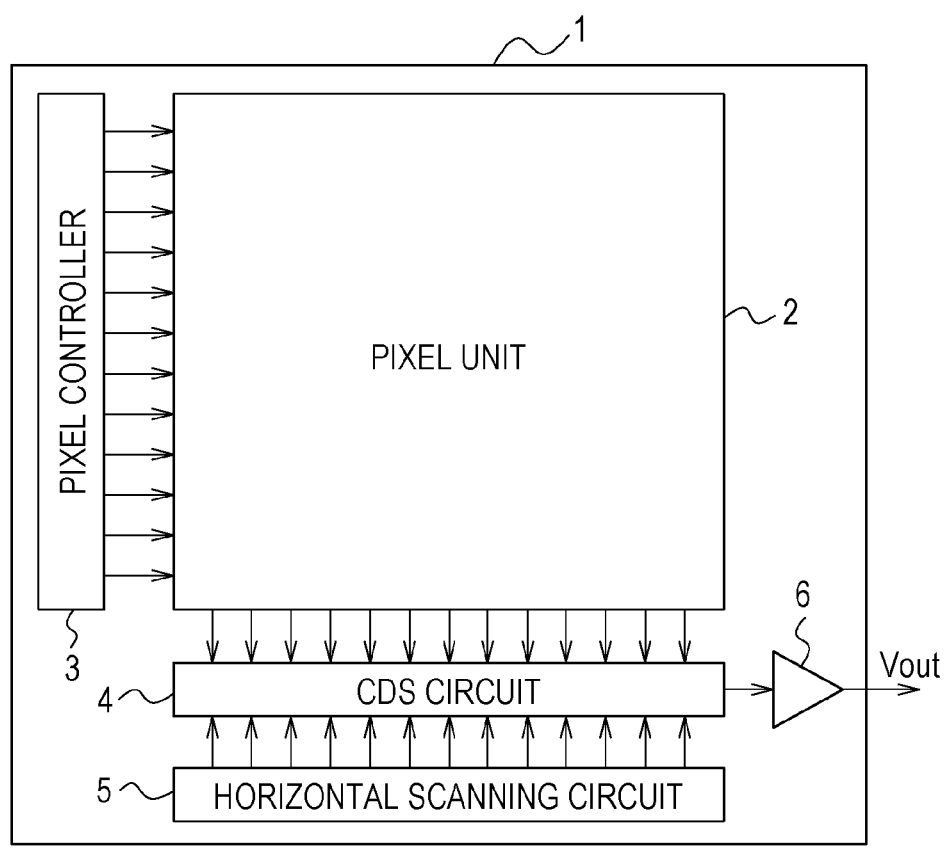
FIG. 1 is a diagram illustrating an exemplary configuration of a photoelectric conversion device.

FIG. 1 is a diagram illustrating an exemplary configuration of a photoelectric conversion device 1 according to a first embodiment. The photoelectric conversion device 1 includes a pixel unit 2, a pixel controller 3, a correlated double sampling (CDS) circuit 4, a horizontal scanning circuit 5, and an output amplifier 6. In the pixel unit 2, pixels each having a photoelectric conversion unit are arranged in two dimensions (two-dimensional matrix). The pixel controller 3 exerts control so that charges in the photoelectric conversion units in the pixel unit 2 are read out, and that the charges are mixed or reset. The CDS circuit 4 includes unit CDS circuits. Each of the unit CDS circuits, which is provided for each of the pixel columns or each group of the pixel columns in the pixel unit 2, performs CDS on a signal which is read out by the pixel controller 3. Specifically, the CDS circuit 4 outputs the difference between the reset level and the signal level which are obtained from each of the pixels, or the difference between a reset level containing an offset of a path along which a signal is read out and a signal level. Thus, a fixed pattern noise caused by variation in pixels and a reset noise are removed. The difference between a reset level and a signal level may be obtained by the output amplifier 6, or may be obtained outside of the photoelectric conversion device 1. After the CDS circuit 4 performs CDS, the horizontal scanning circuit 5 selects a signal stored in each of the columns in time sequence. The output amplifier 6 amplifies a signal selected by the horizontal scanning circuit 5, and outputs it as an output signal Vout.

One disclosed feature of the embodiments may be described as a process which is usually depicted as a timing chart or diagram. A timing diagram may illustrate the timing relationships of several entities, such as signals, events, etc. Although a timing diagram may describe the operations as a sequential process, some operations may be performed in parallel or concurrently. In addition, unless specifically stated, the order of the operations or timing instants may be re-arranged. Furthermore, the timing or temporal distances may not be scaled or depict the timing relationships in exact proportions.

Figure 2:
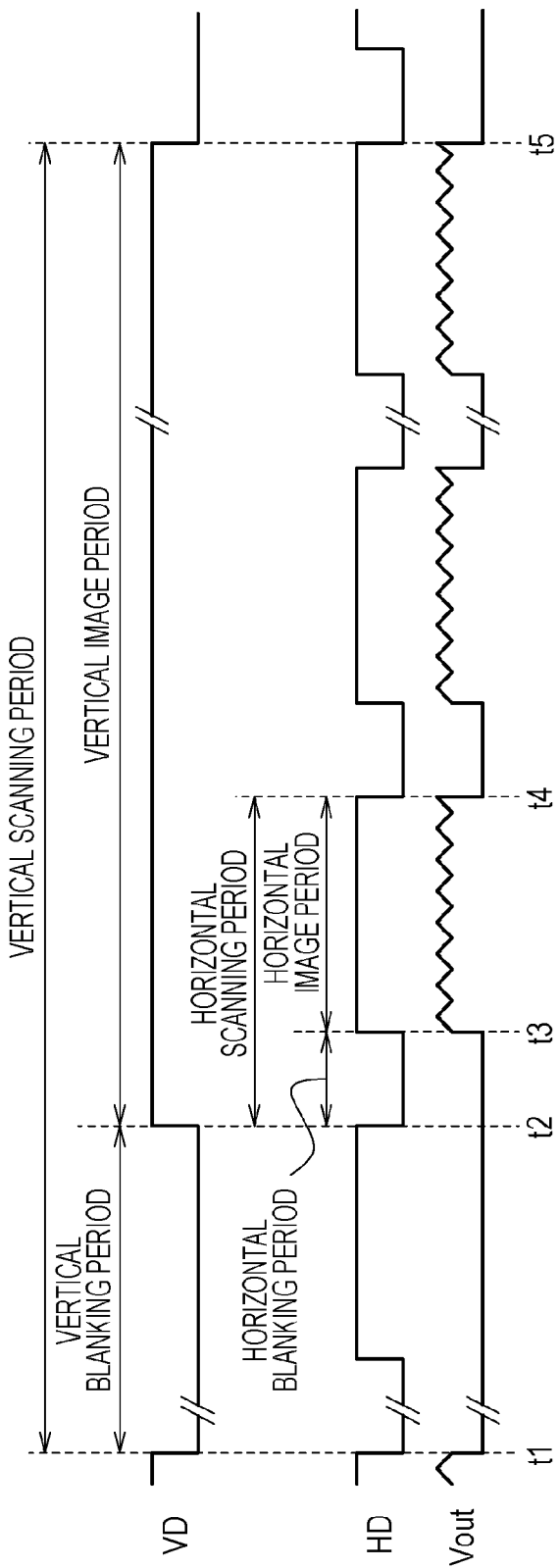
FIG. 2 is a timing chart of an output signal and image synchronizing signals of a photoelectric conversion device.

FIG. 2 is a timing chart illustrating the relationship between the output signal Vout and image synchronizing signals in the photoelectric conversion device 1 in FIG. 1. In FIG. 2, the signal VD is a vertical synchronizing signal, and a period from time t1 to t5 corresponds to one vertical scanning period. In the vertical scanning period, the period from time t1 to t2 corresponds to a vertical blanking period, and the period from time t2 to t5 corresponds to a vertical image period. The signal HD is a horizontal synchronizing signal, and the period from time t2 to t4 corresponds to one horizontal scanning period. In the horizontal scanning period, the period from time t2 to t3 corresponds to a horizontal blanking period, and the period from time t3 to t4 corresponds to a horizontal image period. The signal Vout schematically represents the output signal Vout of the photoelectric conversion device 1 in FIG. 1. A row is selected in a horizontal blanking period by the pixel controller 3, and a signal based on a charge in a photoelectric conversion unit in the pixel unit 2 is read out as a pixel signal from the pixel unit 2 and is output to the CDS circuit 4. Pixel signals held in the CDS circuit 4 are sequentially selected in a horizontal image period by the horizontal scanning circuit 5, and a signal obtained through amplification performed by the output amplifier 6 is output as the output signal Vout of the photoelectric conversion device 1.

Figure 3:
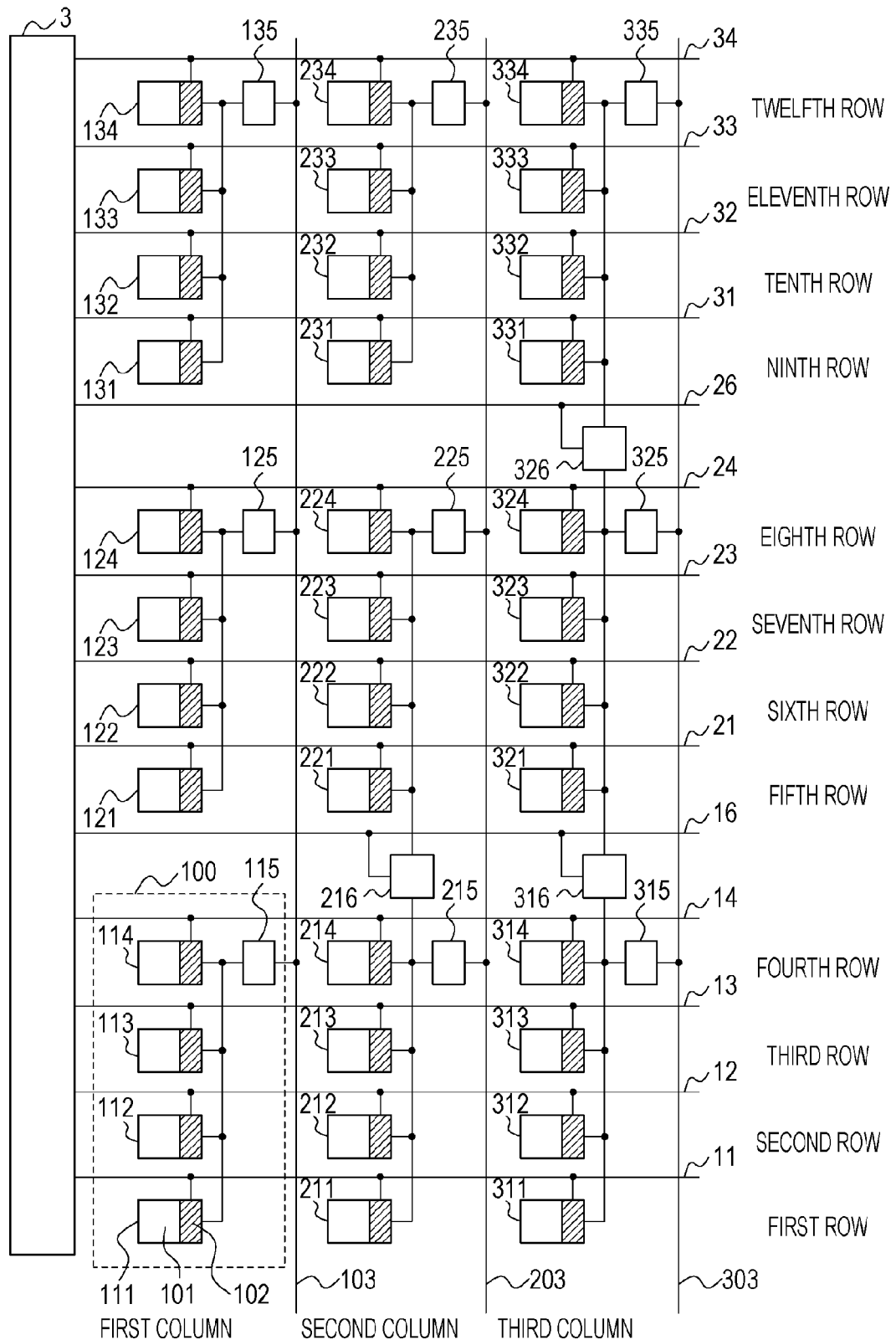
FIG. 3 is a diagram illustrating an exemplary configuration of the pixel unit in FIG. 1.

FIG. 3 is a diagram for describing an exemplary configuration of the pixel unit 2 and the pixel controller 3 in FIG. 1. Pixels 111 to 114, 121 to 124, 131 to 134, 211 to 214, . . . , and 331 to 334 are arranged in a two-dimensional matrix. An example is illustrated in which the pixel controller 3 controls unit pixel cells 100 which are arranged in such a manner that three are arranged in the vertical direction (first direction) in FIG. 2, and three are arranged in the horizontal direction (second direction) in FIG. 2. A pixel column arranged on the left is referred to as a first pixel group; in the middle, a second pixel group; and on the right, a third pixel group. A unit pixel cell 100 includes the four pixels 111, 112, 113 and 114 which are arranged in the same column and in different rows, and also includes a signal reading out unit 115 shared by the four pixels. The four pixels 111 to 114 are arranged in a matrix having four rows and one column. The pixels 111 to 114 each include a photoelectric conversion unit 101 and a transfer unit 102, and are connected via the transfer units 102 to one another and further to the signal reading out unit 115. The transfer unit 102 transfers a charge in the photoelectric conversion unit 101 to the input node of the signal reading out unit 115. A signal which is output from the signal reading out unit 115 is input to the CDS circuit 4 illustrated in FIG. 1, via a vertical signal line 103. Control signals supplied from transfer control lines 11, 12, 13, and 14 which are connected to the pixel controller 3 enable the transfer units 102 of the pixels 111 to 114 to be independently controlled. The transfer units 102 of the pixels 114, 214, 314, and the like which are arranged in the same row are connected to one of the transfer control lines 14 and the like which is in the corresponding row. Each of signals from the signal reading out units 115, 125, and 135 is output to one of the vertical signal lines 103 and the like which is in the corresponding column. Connection units 216, 316, and 326 each connect the output nodes of the pixels included in unit pixel cells 100 to one another electrically. Connection-unit control lines 16 and 26 are used to control the connection units 216, 316, and 326. The connection units 216 and 316 are connected to the connection-unit control line 16, and the connection unit 326 is connected to the connection-unit control line 26. No connection units are provided for the first pixel group arranged on the left. Therefore, in the first pixel group, the output nodes of the four pixels are electrically connected to one another. In the second pixel group arranged in the middle, one connection unit, i.e., the connection unit 216, is provided. The maximum number of output nodes of pixels which may be electrically connected by the connection unit 216 is eight. Two connection units, i.e., the connection units 316 and 326, are provided for the third pixel group arranged in the right. The maximum number of output nodes of pixels which may be electrically connected by the connection units 316 and 326 is 12. That is, the number of output nodes of pixels which may be electrically connected by connection units depends on a pixel group. This configuration enables reading out of signals in which a different number of pixels are added depending on a pixel group, while reading out of signals at high speed is achieved. The connection units provided for the pixel columns are collectively designated as a connection section. When the connection section for each of the pixel columns is to be differentiated, an expression, such as "first connection section" or "second connection section", is used.

Figure 4:
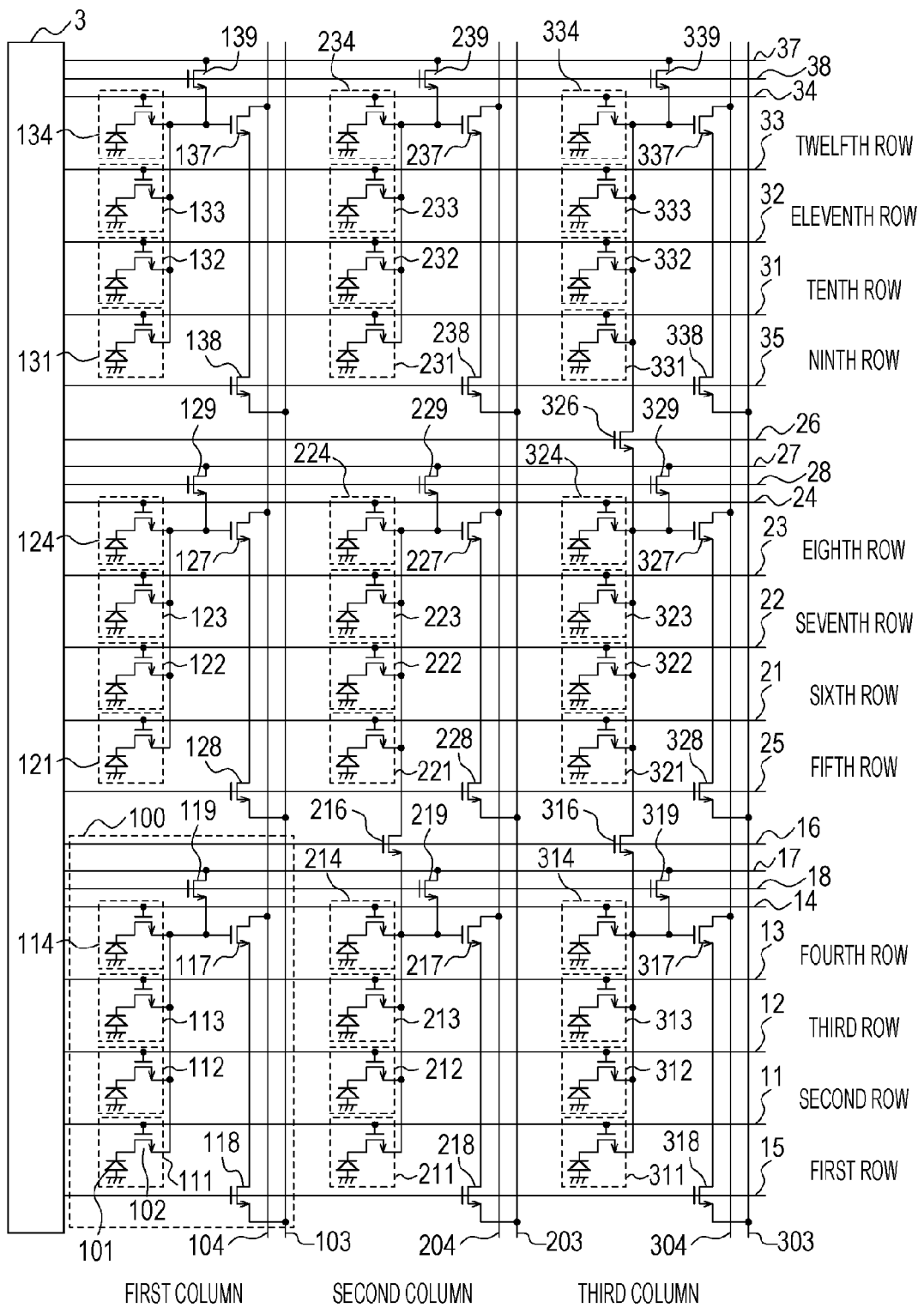
FIG. 4 is an equivalent circuit diagram for describing the exemplary configuration of the pixel unit in FIG. 3.

FIG. 4 is an equivalent circuit diagram for describing an exemplary configuration of the pixel unit 2 in FIG. 3. A unit pixel cell 100 in FIG. 4 is equivalent to that in FIG. 3. In FIG. 4, an example is illustrated in which the pixel controller 3 controls unit pixel cells 100 which are arranged in such a manner that three are arranged in the row direction, and three are arranged in the column direction. The pixel 111 includes the photoelectric conversion unit 101 and the transfer unit 102. The photoelectric conversion unit 101 may be formed of a photodiode, and the transfer unit 102 may be formed of a field effect transistor. The gate of the transistor 102 is connected to the transfer control line 11 connected to the pixel controller 3. By supplying an adequate voltage to the transfer control line 11, the transistor 102 is turned on, and a charge generated in the photodiode 101 is transferred to a floating diffusion region. A node corresponding to a floating diffusion region corresponds to the output node of a pixel. The unit pixel cell 100 includes the pixels 111, 112, 113, and 114, and transistors 117, 118, and 119. The transistor 117 may function as a signal reading out unit, and is an output transistor for converting the charges transferred from the pixels 111 to 114 into a voltage signal and outputting it. The gate of the output transistor 117 may function as the input node of a signal reading out unit. The output nodes of the pixels and the input node of the signal reading out unit are electrically connected to one another. They may be regarded as the same node from the electrical viewpoint. The transistor 118 is a row selecting transistor for selecting a row. The transistor 119 is a reset transistor for resetting the pixels 111 to 114 and the floating diffusion regions to a predetermined potential. Each of the pixels 111, 112, 113, and 114 has a floating diffusion region corresponding thereto, and the floating diffusion regions are connected to one another and further to the gate of the transistor 117. The transistor 117 has a drain connected to a power supply line 104 and a source connected to the drain of the transistor 118. The gate of the transistor 118 is connected to a row selection control line 15 connected to the pixel controller 3. The transistor 118 is subjected to on/off control using a voltage applied to the gate, thereby selecting a row from which a pixel signal is to be output. The source of the transistor 118 is connected to the vertical signal line 103. The transistor 117 is supplied with a bias current, and functions as a source follower. The transistor 117 outputs a pixel signal according to the amount of electric charge transferred to a floating diffusion region, to the vertical signal line 103. The drain of the transistor 119 is connected to a reset line 17 connected to the pixel controller 3, and the source is connected to the floating diffusion regions. Furthermore, the gate of the transistor 119 is connected to a reset control line 18 connected to the pixel controller 3. The transistor 119 is subjected to on/off control using a voltage applied to the gate. Thus, the pixels 111 to 114 and the floating diffusion regions may be reset to a predetermined potential. To each of the transfer control lines 11 to 14, 21 to 24, and 31 to 34 connected to the pixel controller 3, the gates of the transistors of the transfer units 102 that are in the corresponding row are connected. Similarly, to each of the row selection control lines 15, 25, and 35 connected to the pixel controller 3, some of the selection transistors 118, 128, 138, and the like which are in the corresponding row are connected. In addition, to each of the reset lines 17, 27, and 37 and the reset control lines 18, 28, and 38, some of the reset transistors 119, 129, 139, and the like which are in the corresponding row are connected. To each of the vertical signal lines 103, 203, and 303, some of the row selecting transistors 118, 218, 318, and the like which are in the corresponding column are connected. To each of the power supply lines 104, 204, and 304, some of the amplifying transistors 117, 217, 317, and the like which are in the corresponding column are connected.

The transistors 216, 316, and 326 in FIG. 4 are connection transistors for connecting unit pixel cells 100 to one another. A connection transistor may function as a connection unit. In a planar layout, the connection transistor 216 is disposed in a region between the region in which the pixel 214 is disposed and the region in which the pixel 221 is disposed. Similarly, the connection transistor 316 is disposed between the pixel 314 and the pixel 321. The connection transistor 326 is disposed between the pixel 324 and the pixel 331. Thus, the output nodes of the pixels included in unit pixel cells 100 are electrically connected. The gates of the connection transistors 216 and 316 are connected to one another via the connection control line 16 connected to the pixel controller 3. The gate of the connection transistor 326 is connected to the connection control line 26 connected to the pixel controller 3. Each of the connection transistors 216, 316, and 326 controls electrical connection between the output nodes of the pixels of unit pixel cells 100 by using on/off control using a voltage applied to the gate.

A first unit pixel cell 100 including the pixels 111 to 114, a second unit pixel cell 100 including the pixels 121 to 124, and a unit pixel cell 100 including the pixels 131 to 134 are connected to the vertical signal line 103. A third unit pixel cell 100 including the pixels 211 to 214, a fourth unit pixel cell 100 including the pixels 221 to 224, and a unit pixel cell 100 including the pixels 231 to 234 are connected to the vertical signal line 203. A fifth unit pixel cell 100 including the pixels 311 to 314, a sixth unit pixel cell 100 including the pixels 321 to 324, and a seventh unit pixel cell 100 including the pixels 331 to 334 are connected to the vertical signal line 303. The connection unit 216 connects the unit pixel cell 100 including the pixels 211 to 214 to the unit pixel cell 100 including the pixels 221 to 224 in accordance with a signal in the connection control line 16. The connection unit 316 connects the unit pixel cell 100 including the pixels 311 to 314 to the unit pixel cell 100 including the pixels 321 to 324 in accordance with the signal in the connection control line 16. The connection units 216 and 316 establishes connection in accordance with the same signal in the connection control line 16. The connection unit 326 connects the unit pixel cell 100 including the pixels 321 to 324 to the unit pixel cell 100 including the pixels 331 to 334 in accordance with a signal in the connection control line 26.

The unit pixel cell 100 including the pixels 111 to 114 has the multiple (four) pixels 111 to 114 and the transistors 117 to 119. Each of the four pixels 111 to 114 has a first photoelectric conversion unit 101 and a first transfer unit 102. The first transfer unit 102 transfers a charge in the first photoelectric conversion unit 101 to the floating diffusion region. The transistors 117 to 119, which correspond to the first signal reading out unit 115 in FIG. 3, output a voltage based on a charge in a floating diffusion region to the first signal line 103. The first reset transistor 119 is a transistor for resetting the potentials of the first photoelectric conversion units 101 and the floating diffusion regions. The gate of the first amplifying transistor 117 is connected to the floating diffusion regions. The first selection transistor 118 is connected between the source of the first amplifying transistor 117 and the first signal line 103. The configuration of the unit pixel cell 100 including the pixels 111 to 114 is described as an example. The unit pixel cell 100 including the pixels 121 to 124, the unit pixel cell 100 including the pixels 131 to 134, the unit pixel cell 100 including the pixels 211 to 214, and the like also have a similar configuration.

The second unit pixel cell 100 including the pixels 121 to 124 has four second photoelectric conversion units 101 and four second transfer units 102 which are included in the four pixels 121 to 124, and a second signal reading out unit 125 (FIG. 3), and is connected to the first signal line 103. The second signal reading out unit 125 includes the second reset transistor 129, a second amplifying transistor 127, and the second selection transistor 128. The gate of the second amplifying transistor 127 is connected to the floating diffusion regions. The third unit pixel cell 100 including the pixels 211 to 214 has four third photoelectric conversion units 101 and four third transfer units 102 which are included in the four pixels 211 to 214, and a third signal reading out unit 215 (FIG. 3), and is connected to the second signal line 203. The third signal reading out unit 215 includes a third reset transistor 219, the third amplifying transistor 217, and the third selection transistor 218. The gate of the third amplifying transistor 217 is connected to the floating diffusion regions. The fourth unit pixel cell 100 including the pixels 221 to 224 has four fourth photoelectric conversion units 101 and four fourth transfer units 102 which are included in the four pixels 221 to 224, and a fourth signal reading out unit 225 (FIG. 3), and is connected to the second signal line 203. The fourth signal reading out unit 225 includes a fourth reset transistor 229, a fourth amplifying transistor 227, and a fourth selection transistor 228. The gate of the fourth amplifying transistor 227 is connected to the floating diffusion regions. The fifth unit pixel cell 100 including the pixels 311 to 314 has four fifth photoelectric conversion units 101 and four fifth transfer units 102 which are included in the four pixels 311 to 314, and a fifth signal reading out unit 315 (FIG. 3), and is connected to the third signal line 303. The fifth signal reading out unit 315 includes a fifth reset transistor 319, the fifth amplifying transistor 317, and the fifth selection transistor 318. The gate of the fifth amplifying transistor 317 is connected to the floating diffusion regions. The sixth unit pixel cell 100 including the pixels 321 to 324 has four sixth photoelectric conversion units 101 and four sixth transfer units 102 which are included in the four pixels 321 to 324, and a sixth signal reading out unit 325 (FIG. 3), and is connected to the third signal line 303. The sixth signal reading out unit 325 includes a sixth reset transistor 329, a sixth amplifying transistor 327, and a sixth selection transistor 328. The gate of the sixth amplifying transistor 327 is connected to the floating diffusion regions. The seventh unit pixel cell 100 including the pixels 331 to 334 has four seventh photoelectric conversion units 101 and four seventh transfer units 102 which are included in the four pixels 331 to 334, and a seventh signal reading out unit 335 (FIG. 3), and is connected to the third signal line 303. The seventh signal reading out unit 335 includes a seventh reset transistor 339, a seventh amplifying transistor 337, and a seventh selection transistor 338. The gate of the seventh amplifying transistor 337 is connected to the floating diffusion regions. The connection unit 216 connects the floating diffusion regions in the third unit pixel cell 100 including the pixels 211 to 214 to the floating diffusion regions in the fourth unit pixel cell 100 including the pixels 221 to 224. The connection unit 316 connects the floating diffusion regions in the fifth unit pixel cell 100 including the pixels 311 to 314 to the floating diffusion regions in the sixth unit pixel cell 100 including the pixels 321 to 324. The third connection unit 326 connects the floating diffusion regions in the sixth unit pixel cell 100 including the pixels 321 to 324 to the floating diffusion regions in the seventh unit pixel cell 100 including the pixels 331 to 334.

Figure 5:
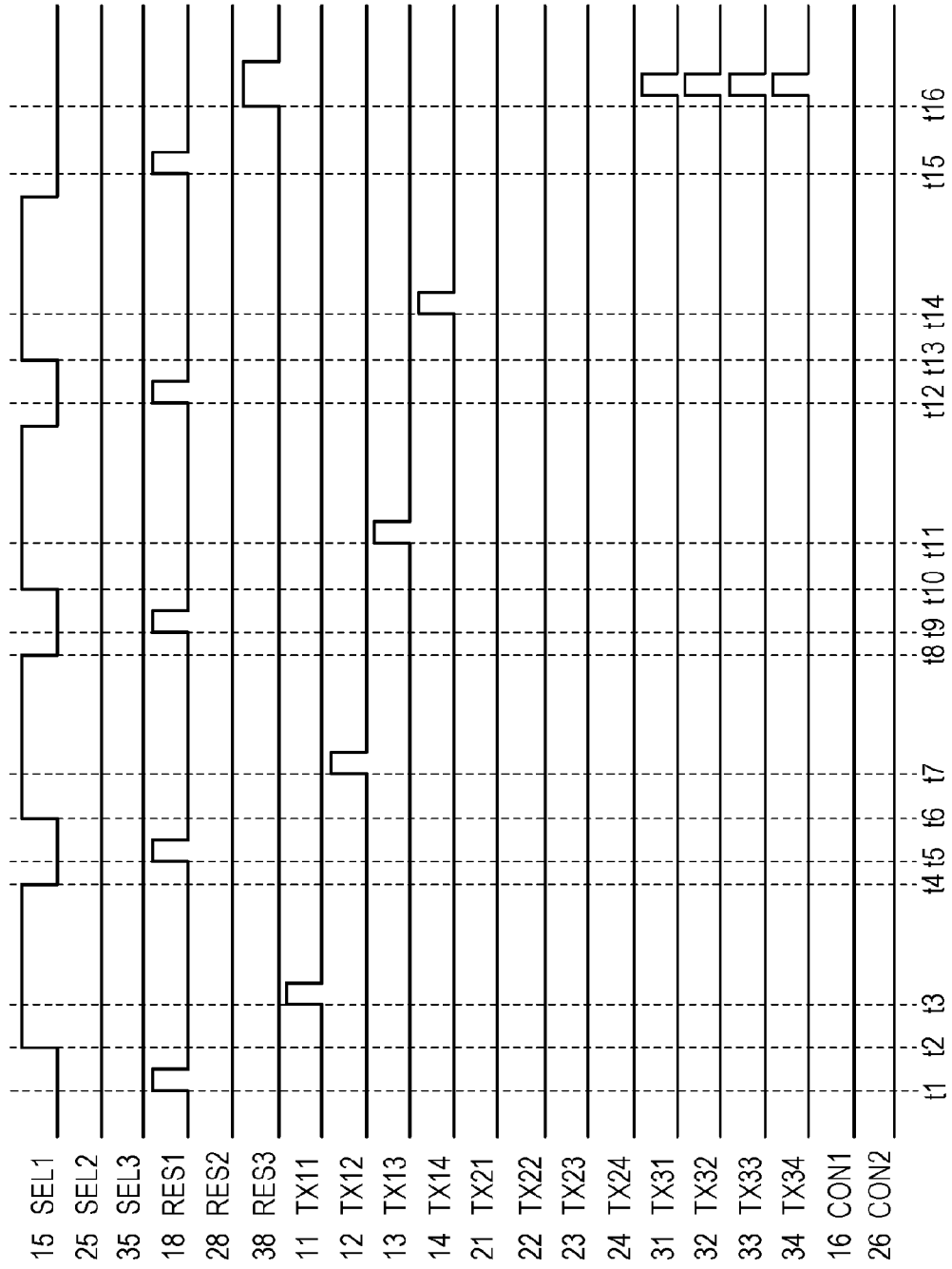
FIG. 5 is a timing chart for describing reading out of signals in the pixel unit in FIG. 4.

FIG. 5 is a timing chart for one horizontal blanking period for describing reading out of signals in the pixel unit 2 in FIG. 4. In FIG. 5, a number written along with a signal name corresponds to the number of a control line in FIG. 4. For example, 15 SEL1 represents the name of a pulse applied to the row selection control line 15 in FIG. 4. The timing chart in FIG. 5 describes an example in which all of the pixel signals are read out in such a manner that pixel signals from four pixels constituting a unit pixel cell 100 are read out to the CDS circuit 4. FIG. 4 illustrates an exemplary rolling shutter operation in which pixel signals are read out from the first to fourth pixel rows, in which accumulation operations are performed for the fifth to eighth pixel rows, and in which the pixels are reset for the ninth to twelfth pixel rows.

At time t1, when the pulse RES1 in the reset control line 18 is set to the high level, the reset transistors 119, 219, and 319 are turned on, and the floating diffusion regions for the pixels in the first to fourth rows are reset to the potential supplied from the reset line 17. At time t2, when the pulse SEL1 in the row selection control line 15 is set to the high level, the row selecting transistors 118, 218, and 318 are turned on, and the sources of the output transistors 117, 217, and 317 are electrically connected to the vertical signal lines 103, 203, and 303, respectively. At time t3, when the pulse TX11 in the transfer control line 11 is set to the high level, the transistors 102 of the pixels 111, 211, and 311 are turned on, whereby charges in the photodiodes 101 are transferred to the floating diffusion regions. At that time, voltage signals according to the transferred charges are output to the vertical signal lines 103, 203, and 303 by the output transistors 117, 217, and 317. At time t4, the pulse SEL1 in the row selection control line 15 is set to the low level. At time t5, when the pulse RES1 in the reset control line 18 is set to the high level, the floating diffusion regions for the pixels in the first to fourth rows are reset again. At time t6, the pulse SEL1 in the row selection control line 15 is set to the high level. At time t7, when the pulse TX12 in the transfer control line 12 is set to the high level, the signals from the pixels 112, 212, and 312 are output to the vertical signal lines 103, 203, and 303, respectively. Similarly, at time t8, the pulse SEL1 in the row selection control line 15 is set to the low level. At time t9, when the pulse RES1 in the reset control line 18 is set to the high level, the floating diffusion regions for the pixels in the first to fourth rows are reset again. At time t10, the pulse SEL1 in the row selection control line 15 is set to the high level. At time t11, when the pulse TX13 in the transfer control line 13 is set to the high level, the signals from the pixels 113, 213, and 313 are output to the vertical signal lines 103, 203, and 303, respectively. Similarly, at time t12, the pulse RES1 in the reset control line 18 is set to the high level. At time t13, the pulse SEL1 in the row selection control line 15 is set to the high level. At time t14, when the pulse TX14 in the transfer control line 14 is set to the high level, the signals from the pixels 114, 214, and 314 are output to the vertical signal lines 103, 203, and 303. At time t15, the pulse RES1 in the reset control line 18 is set to the high level, and the floating diffusion regions for the pixels in the first to fourth rows are reset. At time t16, after the pulse RES3 in the reset control line 38 is set to the high level, the pulses TX31 to TX34 in the transfer control lines 31 to 34 are set to the high level, whereby the photodiodes in the ninth to twelfth rows are reset. The pixel signals which are output to the vertical signal lines 103, 203, and 303 at times t3, t7, t11, and t14 are output to the CDS circuit 4 in FIG. 1.

Figure 6:
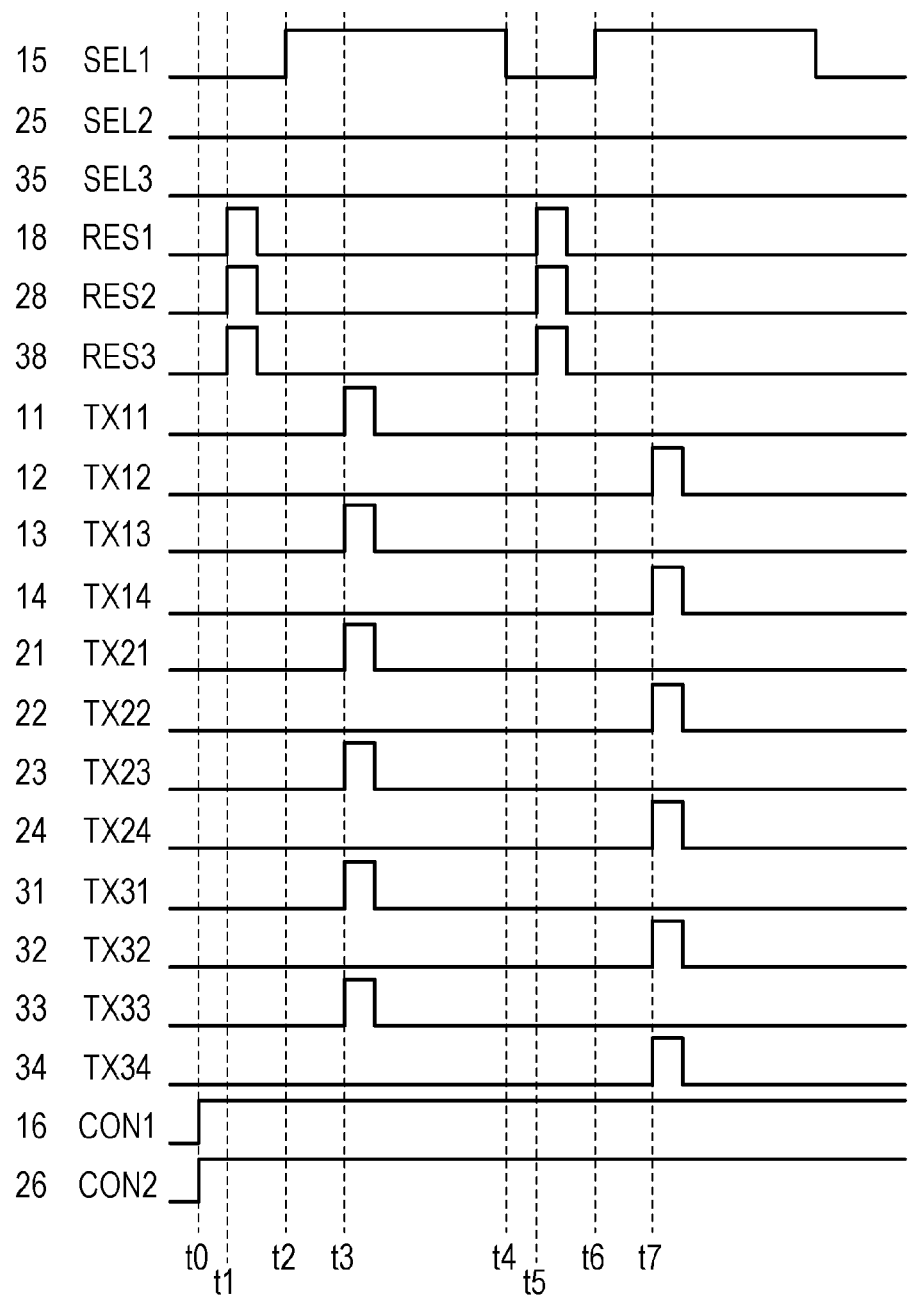
FIG. 6 is a timing chart for describing reading out of a mixing signal in the pixel unit in FIG. 4.

FIG. 6 is a timing chart illustrating the case in which signals in the pixel unit 2 in FIG. 4 are mixed and read out in one horizontal blanking period. In the first column, a mixing signal from two pixels in a unit pixel cell 100 is output; in the second column, from four pixels in two unit pixel cells 100; and in the third column, from six pixels in three unit pixel cells 100. The name of a signal in FIG. 6 is designated in a manner similar to that in FIG. 5.

At time t0, when the pulse CON1 in the connection control line 16 and the pulse CON2 in the connection control line 26 are set to the high level, the connection transistors 216, 316, and 326 are turned on. Then, the output nodes of the pixels in the unit pixel cells 100 connected to the connection transistors 216, 316, and 326 are electrically connected to one another. At time t1, the pulses RES1 to RES3 in the reset control lines 18, 28, and 38 are set to the high level, and the floating diffusion regions in the first to twelfth rows are reset. At time t2, the pulse SEL1 in the row selection control line 15 is set to the high level, and the row selecting transistors 118, 218, and 318 are turned on. At time t3, when the pulses TX11, TX13, TX21, TX23, TX31, and TX33 in the transfer control lines 11, 13, 21, 23, 31, and 33 are set to the high level, charges in the pixels in the odd rows among the first to twelfth rows are transferred. At that time, a mixing signal of the pixels 111 and 113 is output to the vertical signal line 103. A mixing signal of the pixels 211, 213, 221, and 223 is output to the vertical signal line 203. A mixing signal of the pixels 311, 313, 321, 323, 331, and 333 is output to the vertical signal line 303. At time t4, the pulse SEL1 in the row selection control line 15 is set to the low level. At time t5, when the pulses RES1 to RES3 in the reset control lines 18, 28, and 38 are set to the high level, the floating diffusion regions for the pixels in the first to twelfth rows are reset again. At time t6, the pulse SEL1 in the row selection control line 15 is set to the high level. At time t7, when the pulses TX12, TX14, TX22, TX24, TX32, and TX34 in the transfer control lines 12, 14, 22, 24, 32, and 34 are set to the high level, charges in the pixels in the even rows among the first to twelfth rows are transferred. At that time, a mixing signal of the pixels 112 and 114 is output to the vertical signal line 103. A mixing signal of the pixels 212, 214, 222, and 224 is output to the vertical signal line 203. A mixing signal of the pixels 312, 314, 322, 324, 332, and 334 is output to the vertical signal line 303. The pixel signals which are output to the vertical signal lines 103, 203, and 303 at times t3 and t7 are output to the CDS circuit 4 in FIG. 1. The photoelectric conversion device 1 is capable of outputting a mixing signal using two pixels in the first column, a mixing signal using four pixels in the second column, and a mixing signal using six pixels in the third column.

According to the first embodiment, a voltage based on the charges in the floating diffusion regions in the unit pixel cell 100 including the pixels 111 to 114 is output to the vertical signal line 103. At that time, a voltage based on a charge obtained by adding the charges in the floating diffusion regions in the unit pixel cell 100 including the pixels 211 to 214 to the charges in the floating diffusion regions in the unit pixel cell 100 including the pixels 221 to 224 is output to the vertical signal line 203. At the same time, a voltage based on a charge obtained by adding charges in the floating diffusion regions in the unit pixel cell 100 including the pixels 311 to 314, the unit pixel cell 100 including the pixels 321 to 324, and the unit pixel cell 100 including the pixels 331 to 334 is output to the vertical signal line 303. Signals which are each obtained by mixing signals from photoelectric conversion units, the number of which is different from that in another signal, are output at the same time in one horizontal period. Thus, signals having a resolution which is different depending on a column may be output at high speed. Therefore, the number of reading-outs to obtain adequate pixel signals in accordance with brightness may be reduced, and higher-speed automatic exposure control may be achieved.

Second Embodiment

Figure 7:
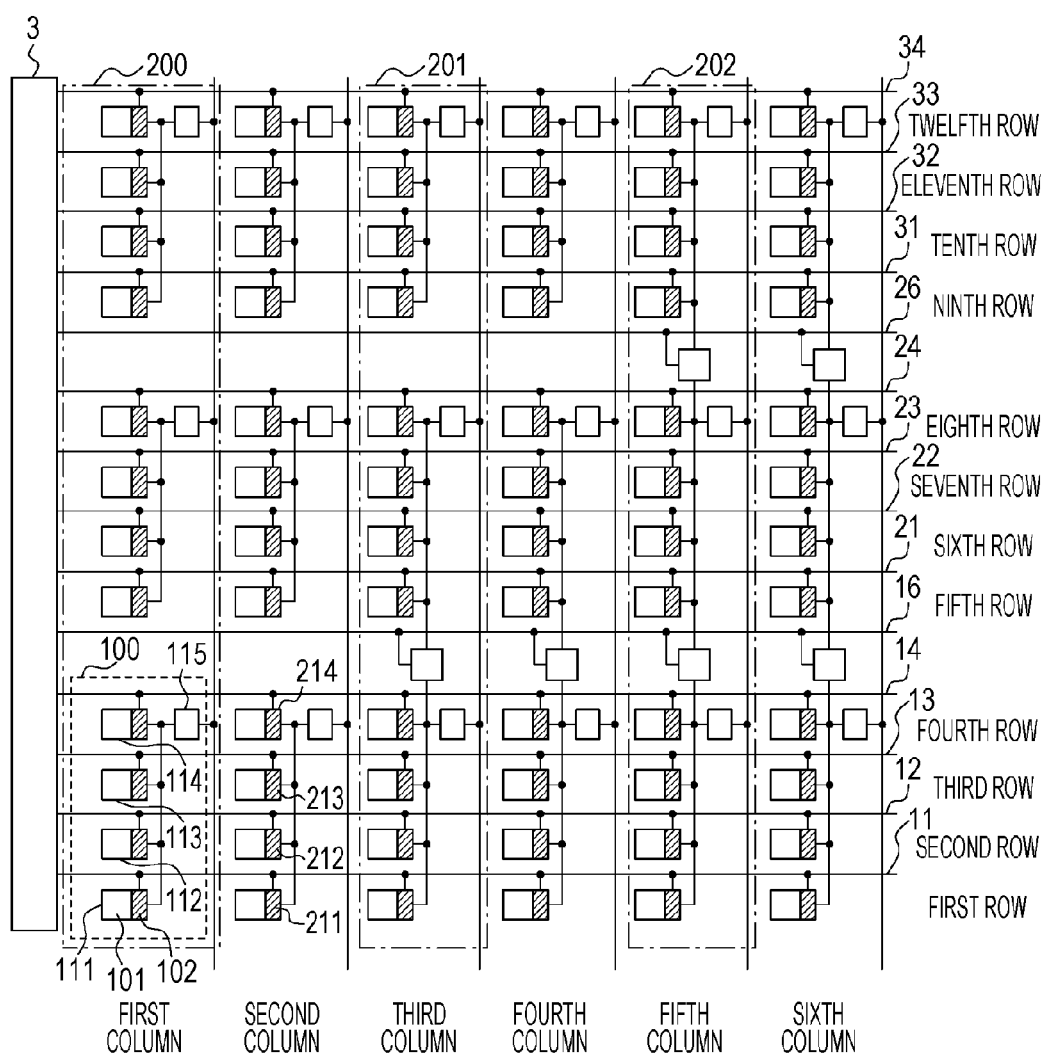
FIG. 7 is a diagram illustrating an exemplary configuration of the pixel unit in FIG. 1.

FIG. 7 is a diagram illustrating an exemplary configuration of the pixel unit 2 (FIG. 1) according to a second embodiment. In FIG. 7, components designated with identical reference numerals in FIG. 3 are similar to those in FIG. 3. Points in the second embodiment which are different from those according to the first embodiment will be described below. In FIG. 7, a pixel group 200 having the same configuration as that in the first column in FIG. 3 is disposed in the first and second columns. A pixel group 201 having the same configuration as that in the second column in FIG. 3 is disposed in the third and fourth columns. A pixel group 202 having the same configuration as that in the third column in FIG. 3 is disposed in the fifth and sixth columns.

According to the second embodiment, each of the pixel groups 200 to 202 described above is arranged in two adjacent columns. Therefore, this configuration is suitable for the case in which a color filter of RGB (red-green-blue) Bayer pattern is included. For example, in the case where the pixels 111 and 113 correspond to a red filter, where the pixels 112, 114, 211, and 213 correspond to a green filter, and where the pixels 212 and 214 correspond to a blue filter, the signals from pixels of the same color in the Bayer pattern may be mixed on the basis of the timing in FIG. 6. That is, each of the connection units 216, 316, and 326 adds the charges from signals of the same color.

Third Embodiment

Figure 8:
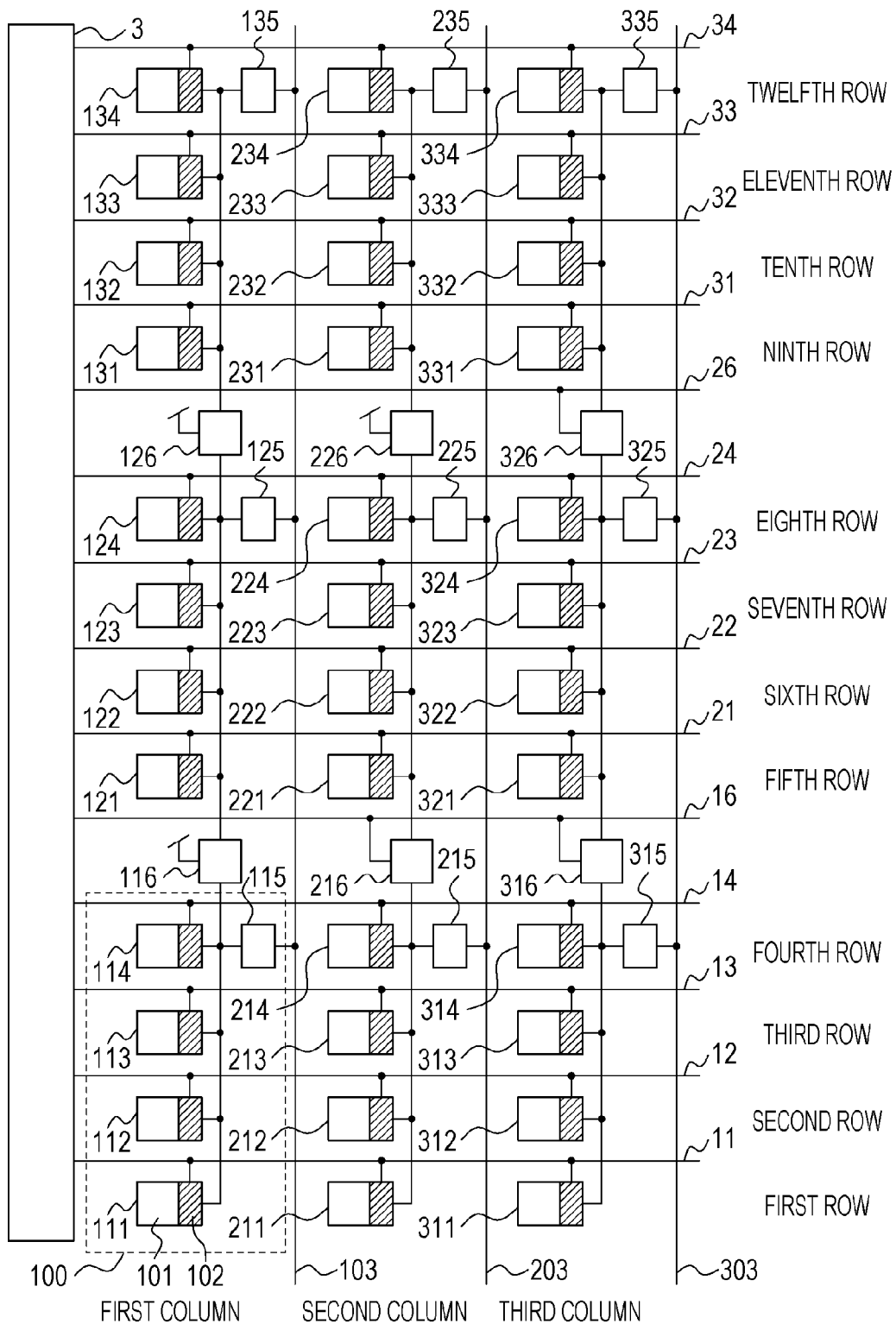
FIG. 8 is a diagram illustrating an exemplary configuration of the pixel unit in FIG. 1.

FIG. 8 is a diagram illustrating an exemplary configuration of the pixel unit 2 (FIG. 1) according to a third embodiment. In FIG. 8, components designated with identical reference numerals in FIG. 3 are similar to those in FIG. 3. Points in the third embodiment which are different from those according to the first embodiment will be described below. FIG. 8 is different from FIG. 3 in that dummy units 116, 126, and 226 are further included. The dummy unit 116 is disposed between the unit pixel cell 100 including the pixels 111 to 114 and the unit pixel cell 100 including the pixels 121 to 124. The dummy unit 126 is disposed between the unit pixel cell 100 including the pixels 121 to 124 and the unit pixel cell 100 including the pixels 131 to 134. The dummy unit 226 is disposed between the unit pixel cell 100 including the pixels 221 to 224 and the unit pixel cell 100 including the pixels 231 to 234. The dummy units 116, 126, and 226 are different from the connection units 216, 316, and 326 in that the dummy units 116, 126, and 226 are not connected to the pixel controller 3, and always cause the output nodes of the pixels in the unit pixel cells 100 not to be electrically connected to one another. It is desirable that the dummy units 116, 126, and 226 have the same configuration as that of a connection unit.

According to the third embodiment, a connection unit or a dummy unit is disposed between any two adjacent unit pixel cells 100 in the column direction. In the third embodiment, the difference in influences from parasitic elements caused by non-uniformity in the layout can be reduced.

Fourth Embodiment

Figure 9:
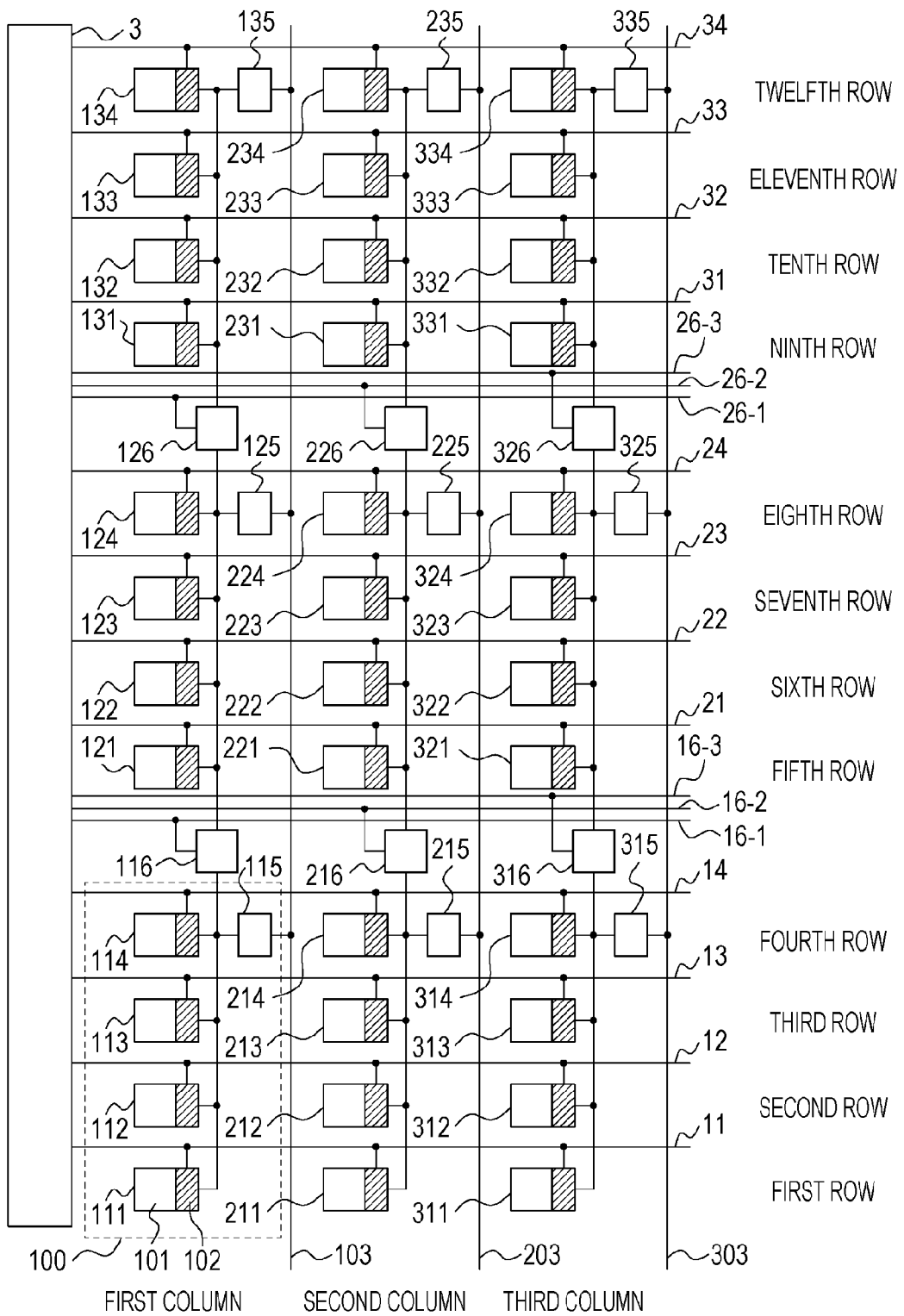
FIG. 9 is a diagram illustrating an exemplary configuration of the pixel unit in FIG. 1.

FIG. 9 is a diagram illustrating an exemplary configuration of the pixel unit 2 (FIG. 1) according to a fourth embodiment. In FIG. 9, components designated with identical reference numerals in FIG. 8 are similar to those in FIG. 8. Points in the fourth embodiment which are different from those according to the third embodiment will be described below. FIG. 9 is different from FIG. 8 in that the dummy unit 116, the connection units 216 and 316, the dummy units 126 and 226, and the connection unit 326 are connected to connection control lines 16-1, 16-2, 16-3, 26-1, 26-2, and 26-3, respectively.

According to the fourth embodiment, the dummy units and the connection units can be independently controlled by the pixel controller 3. Therefore, the fourth embodiment has a feature in which the number of combinations in which signals in the pixel unit 2 are mixed is larger than that in the above-described embodiments.

Fifth Embodiment

Figure 10:
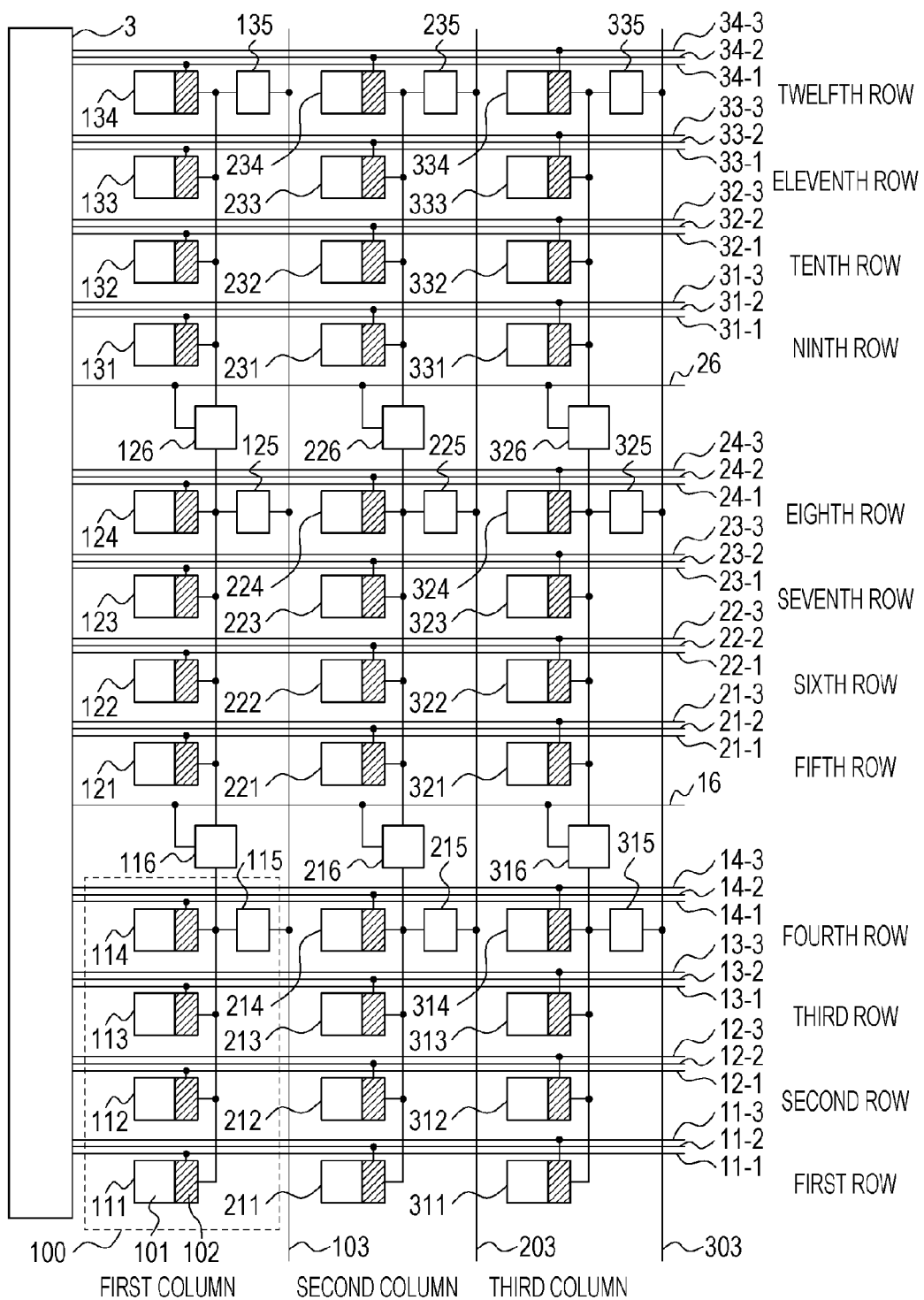
FIG. 10 is a diagram illustrating an exemplary configuration of the pixel unit in FIG. 1.

FIG. 10 is a diagram illustrating an exemplary configuration of the pixel unit 2 (FIG. 1) according to a fifth embodiment. In FIG. 10, components designated with identical reference numerals in FIG. 8 are similar to those in FIG. 8. Points in the fifth embodiment which are different from those according to the third embodiment will be described below. FIG. 10 is different from FIG. 8 in that the dummy unit 116 and the connection units 216 and 316 are connected to the connection control line 16, that the dummy units 126 and 226 and the connection unit 326 are connected to the connection control line 26, and that transfer operations on the pixels in the first to third columns are independently controlled. For example, the transfer units 102 of the pixels 111, 211, and 311 are connected to transfer control lines 11-1, 11-2, and 11-3, respectively, which are different from one another.

According to the fifth embodiment, mixture of signals in pixel unit 2 is performed in such a manner that the number of connections of unit pixel cells 100 is the same in each of the columns. Therefore, the influence from the capacitance accompanied by floating diffusion regions may be the same in each of the columns when mixture is performed.

Sixth Embodiment

Figure 11:
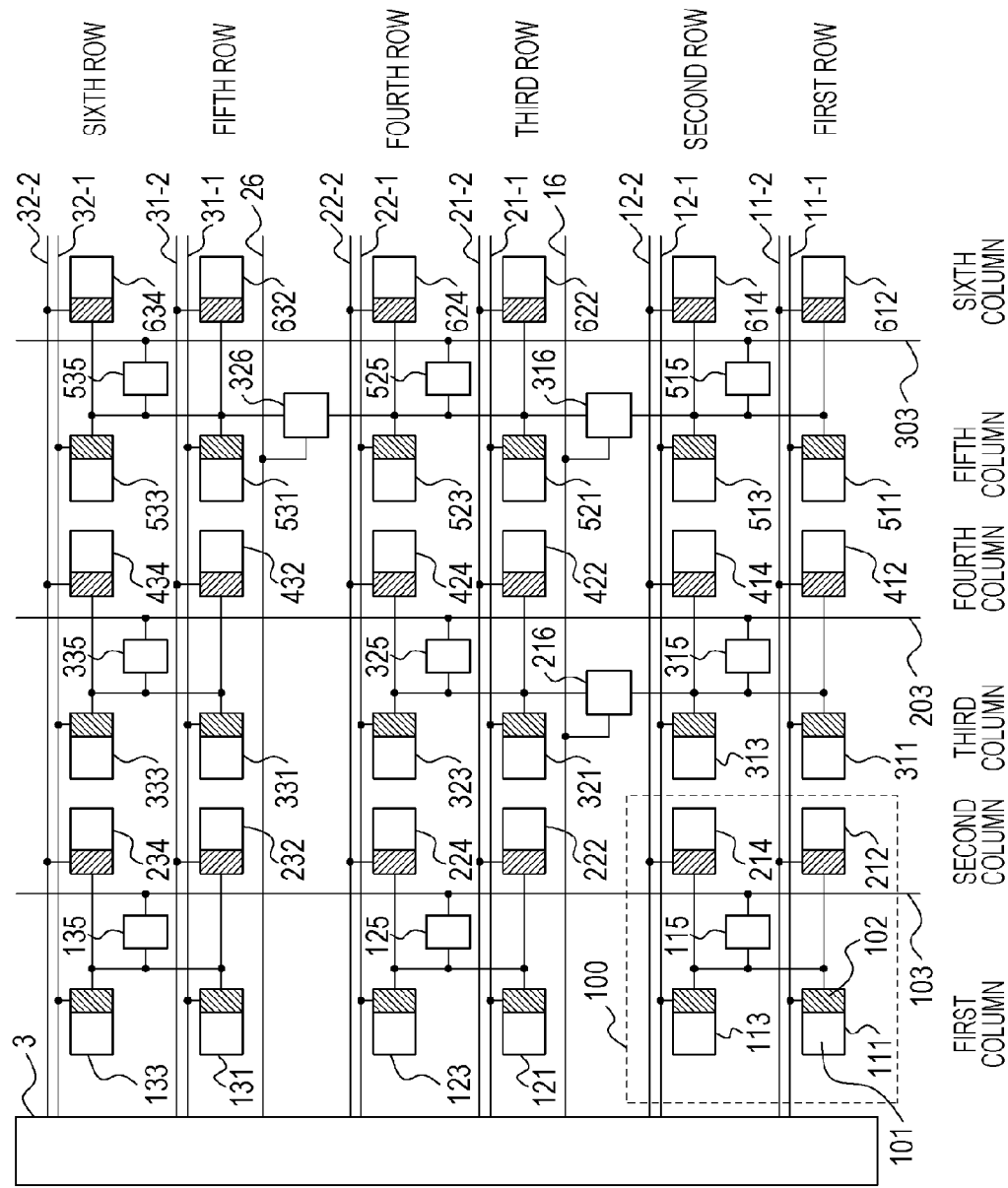
FIG. 11 is a diagram illustrating an exemplary configuration of the pixel unit in FIG. 1.

FIG. 11 is a diagram illustrating an exemplary configuration of the pixel unit 2 (FIG. 1) according to a sixth embodiment. FIG. 11 illustrates an example in which three unit pixel cells 100 disposed in the row direction and three unit pixel cells 100 disposed in the column direction are controlled by the pixel controller 3. The unit pixel cell 100 has the pixels 111, 212, 113, and 214 and the signal reading out unit 115. The embodiment in FIG. 11 is different from the above-described embodiments in that pixels are arranged in a matrix having two rows and two columns in the sixth embodiment, whereas pixels are arranged in a matrix having four rows and one column in a unit pixel cell 100 in the above-described embodiments. A photoelectric conversion unit 101 and a transfer unit 102 included in a pixel are equivalent to those in FIG. 3. Points in the sixth embodiment which are different from those according to the first embodiment will be described below. The transfer units 102 of the pixels 111, 212, 113, and 214 are independently controlled by using control signals supplied from the transfer control lines 11-1, 11-2, 12-1, and 12-2 connected to the pixel controller 3. The transfer units 102 of pixels in the same row and in even columns are connected to one of the transfer control lines 11-2 and the like which is in the corresponding row, and the transfer units 102 of pixels in the same row and in odd columns are connected to one of the transfer control lines 11-1 and the like which is in the corresponding row. To each of the vertical signal lines 103, 203, and 303, the outputs from some of the signal reading out units 115, 315, 515, and the like which are in the corresponding column are connected. The connection units 216, 316, and 326 each connect the output nodes of the pixels in unit pixel cells 100 to one another. The connection-unit control lines 16 and 26 are used to control the connection units 216, 316, and 326. The connection units 216 and 316 are connected to the connection-unit control line 16, and the connection unit 326 is connected to the connection-unit control line 26.

Figure 12:
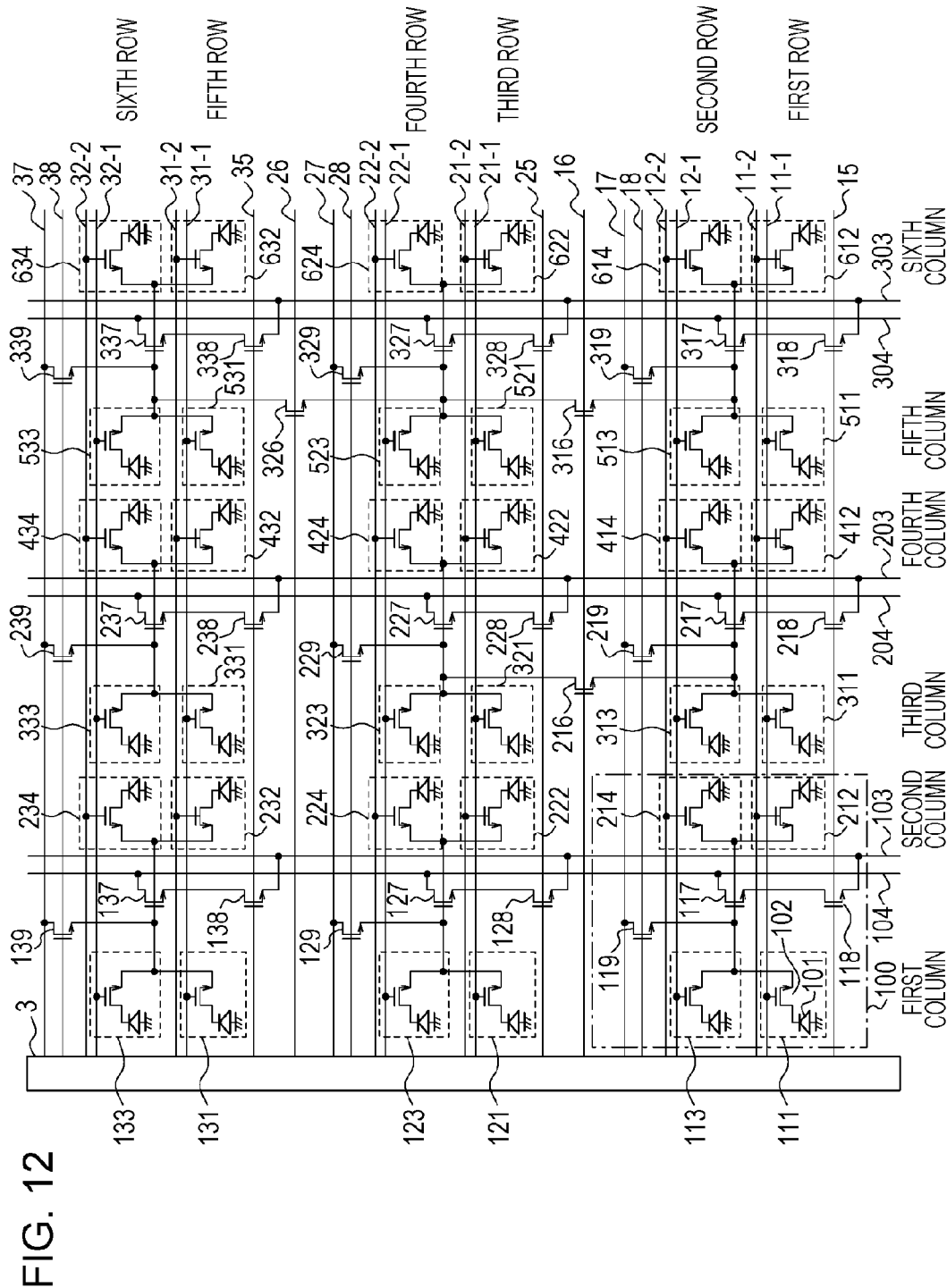
FIG. 12 is an equivalent circuit diagram for describing the exemplary configuration of the pixel unit in FIG. 11.

FIG. 12 is an equivalent circuit diagram for describing an exemplary configuration of the pixel unit 2 in FIG. 11. Components similar to those in the above-described embodiments are designated with similar reference numerals, and will not be described in detail. To each of the transfer control lines 11-1, 12-1, 21-1, 22-1, 31-1, and 32-1 connected to the pixel controller 3, the transfer transistors 102 arranged in the corresponding row and in odd columns are connected. To each of the transfer control lines 11-2, 12-2, 21-2, 22-2, 31-2, and 32-2 connected to the pixel controller 3, the transfer transistors 102 arranged in the corresponding row and in even columns are connected. To each of the row selection control lines 15, 25, and 35 connected to the pixel controller 3, some of the selection transistors 118, 128, 138, and the like which are in the corresponding row are connected. To each of the reset lines 17, 27, and 37 and each of the reset control lines 18, 28, and 38, some of the reset transistors 119, 129, 139, and the like which are in the corresponding row are connected. To each of the vertical signal lines 103, 203, and 303, some of the row selecting transistors 118, 218, 318, and the like which are in the corresponding column are connected. To each of the power supply lines 104, 204, and 304, some of the output transistors 117, 217, 317, and the like which are in the corresponding column are connected.

The transistors 216, 316, and 326 in FIG. 12 are connection transistors for connecting unit pixel cells 100 to one another. The connection transistors 216, 316, and 326 connect the output nodes of the pixels in multiple unit pixel cells 100 to one another. The gates of the connection transistors 216 and 316 are connected to the connection control line 16 connected to the pixel controller 3. The gate of the connection transistor 326 is connected to the connection control line 26 connected to the pixel controller 3. Each of the connection transistors 216, 316, and 326 can control connection of the output nodes of the pixels in unit pixel cells 100 by using on/off control using a voltage applied to the gate.

Figure 13:
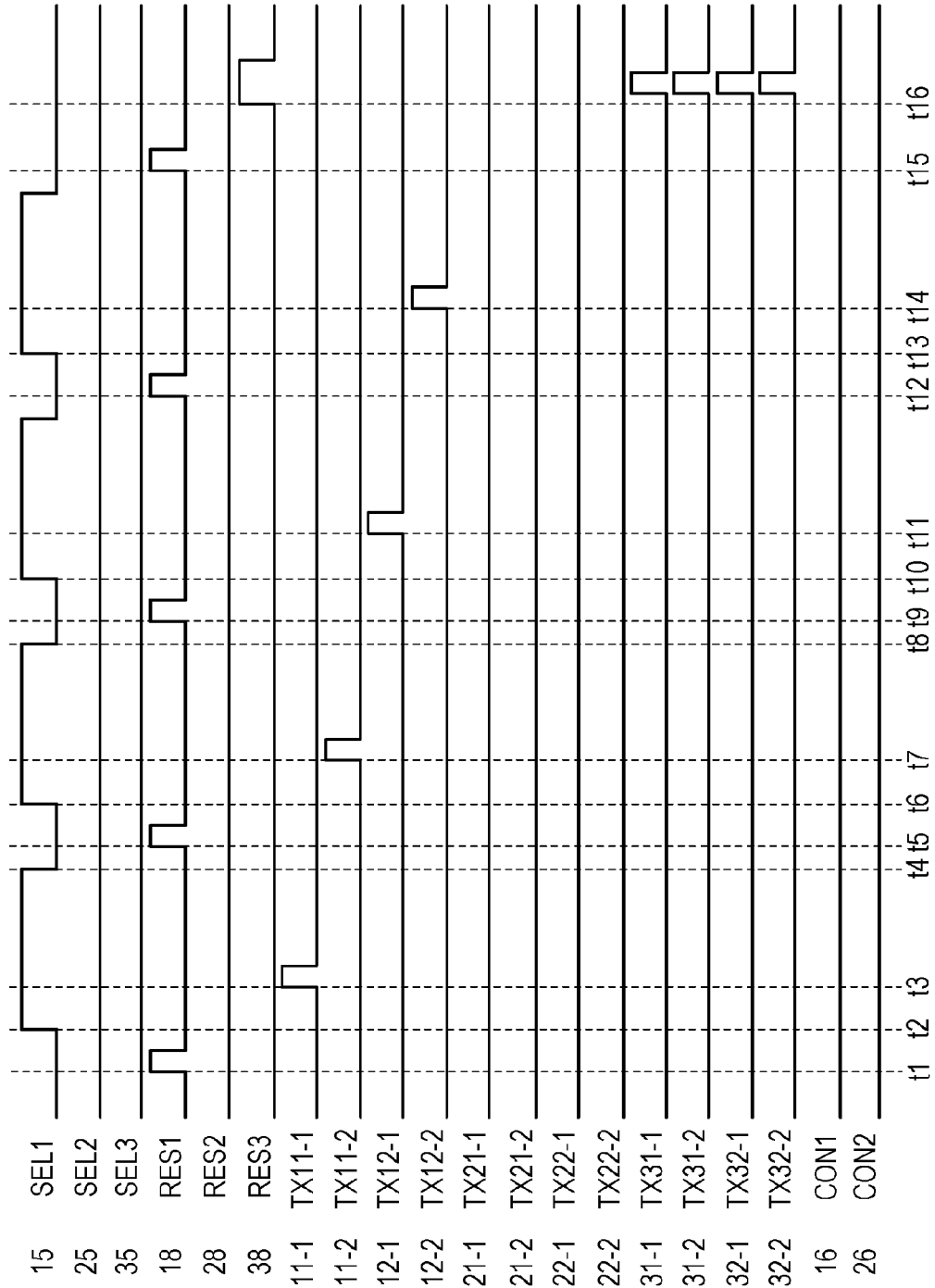
FIG. 13 is a timing chart for describing reading out of signals in the pixel unit in FIG. 12.

FIG. 13 is a timing chart for describing reading out of signals in the pixel unit 2 in FIG. 12. In FIG. 13, a number written along with a signal name corresponds to the number of a control line in FIG. 12. For example, 15 SEL1 represents the name of a pulse applied to the row selection control line 15 in FIG. 12. FIG. 13 illustrates an exemplary rolling shutter operation in which pixel signals are read out from the first and second rows, in which accumulation operations are performed for the third and fourth rows, and in which the pixels are reset for the fifth and sixth rows, in one horizontal blanking period.

At time t1, when the pulse RES1 in the reset control line 18 is set to the high level, the reset transistors 119, 219, and 319 are turned on, and the floating diffusion regions for the pixels in the first and second rows are reset to the potential supplied from the reset line 17. At time t2, when the pulse SEL1 in the row selection control line 15 is set to the high level, the row selecting transistors 118, 218, and 318 are turned on, and the sources of the output transistors 117, 217, and 317 are electrically connected to the vertical signal lines 103, 203, and 303, respectively. At time t3, when the pulse TX11-1 in the transfer control line 11-1 is set to the high level, the transistors 102 of the pixels 111, 311, and 511 are turned on, whereby charges in the photodiodes 101 are transferred to the floating diffusion regions. At that time, voltage signals according to the transferred charges are output to the vertical signal lines 103, 203, and 303 through the output transistors 117, 217, and 317. At time t4, the pulse SEL1 in the row selection control line 15 is set to the low level. At time t5, when the pulse RES1 in the reset control line 18 is set to the high level, the floating diffusion regions for the pixels in the first and second rows are reset again. At time t6, the pulse SEL1 in the row selection control line 15 is set to the high level. At time t7, when the pulse TX11-2 in the transfer control line 11-2 is set to the high level, signals from the pixels 212, 412, and 612 are output to the vertical signal lines 103, 203, and 303, respectively. Similarly, at time t8, the pulse SEL1 in the row selection control line 15 is set to the low level. At time t9, the pulse RES1 in the reset control line 18 is set to the high level. At time t10, the pulse SEL1 in the row selection control line 15 is set to the high level. At time t11, when the pulse TX12-1 in the transfer control line 12-1 is set to the high level, signals from the pixels 113, 313, and 513 are output to the vertical signal lines 103, 203, and 303, respectively. Similarly, at time t12, the pulse RES1 in the reset control line 18 is set to the high level. At time t13, the pulse SEL1 in the row selection control line 15 is set to the high level. At time t14, when the pulse TX12-2 in the transfer control line 12-2 is set to the high level, signals from the pixels 214, 414, and 614 are output to the vertical signal lines 103, 203, and 303, respectively. At time t15, the pulse RES1 in the reset control line 18 is set to the high level, and the floating diffusion regions for the pixels in the first and second rows are reset. At time t16, the pulse RES3 in the reset control line 38 is set to the high level. After that, the pulses TX31-1, TX31-2, TX32-1, and TX32-2 in the transfer control lines 31-1, 31-2, 32-1, and 32-2 are set to the high level, whereby the photodiodes 101 in the fifth and the sixth rows are reset. The pixel signals which are output to the vertical signal lines 103, 203, and 303 at times t3, t7, t11, and t14 are output to the CDS circuit 4 in FIG. 1. The photoelectric conversion device 1 can output signals from all of the pixels in time sequence on the basis of the above-described timing.

Figure 14:
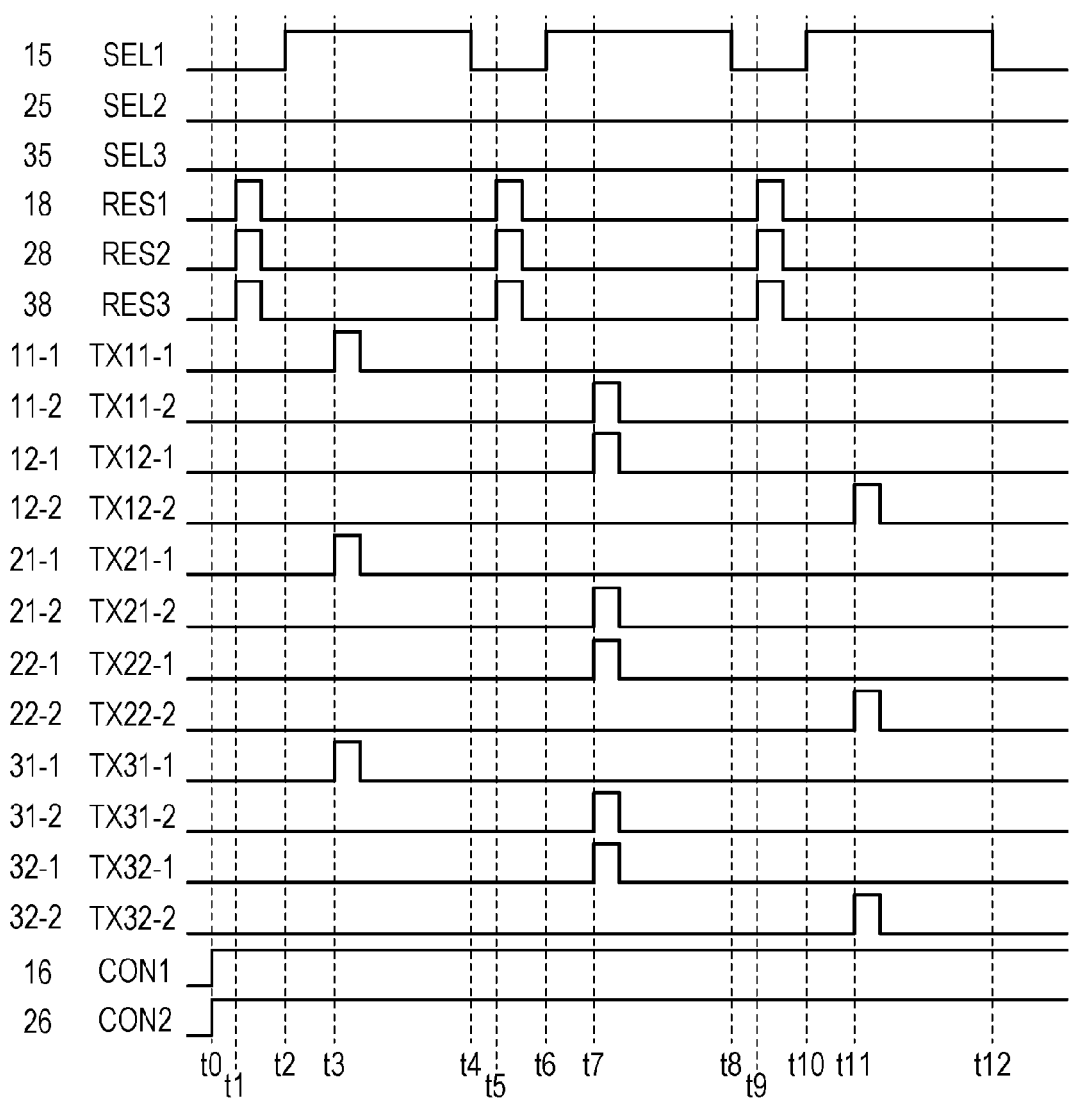
FIG. 14 is a timing chart for describing reading out of a mixing signal in the pixel unit in FIG. 12.

FIG. 14 is a timing chart illustrating the case in which signals in the pixel unit 2 in FIG. 12 are mixed and read out in one horizontal blanking period. The name of a signal in FIG. 14 is similar to that in FIG. 13.

At time t0, when the pulse CON1 in the connection control line 16 and the pulse CON2 in the connection control line 26 are set to the high level, the connection transistors 216, 316, and 326 are turned on. The floating diffusion regions for the unit pixel cells 100 connected to each of the connection transistors 216, 316, and 326 are electrically connected to one another. At time t1, the pulses RES1 to RES3 in the reset control lines 18, 28, and 38 are set to the high level, and the floating diffusion regions in the first to sixth rows are reset. At time t2, the pulse SEL1 in the row selection control line 15 is set to the high level, and the row selecting transistors 118, 218, and 318 are turned on. At time t3, when the pulses TX11-1, TX21-1, and TX31-1 in the transfer control lines 11-1, 21-1, and 31-1 are set to the high level, charges in the pixels in odd columns and in the first, third, and fifth rows are transferred. At that time, a signal from the pixel 111 is output to the vertical signal line 103. A mixing signal from the pixels 311 and 321 is output to the vertical signal line 203. A mixing signal from the pixels 511, 521, and 531 is output to the vertical signal line 303. At time t4, the pulse SEL1 in the row selection control line 15 is set to the low level. At time t5, when the pulses RES1 to RES3 in the reset control lines 18, 28, and 38 are set to the high level, the floating diffusion regions for the pixels in the first to sixth rows are reset again. At time t6, the pulse SEL1 in the row selection control line 15 is set to the high level. At time t7, the pulses TX11-2, TX12-1, TX21-2, TX22-1, TX31-2, and TX32-1 in the transfer control lines 11-2, 12-1, 21-2, 22-1, 31-2, and 32-1 are set to the high level. Then, charges in the pixels in even columns and in the first, third, and fifth rows and the pixels in odd columns and in the second, fourth, and sixth rows are transferred. At that time, a mixing signal from the pixels 212 and 113 is output to the vertical signal line 103. A mixing signal from the pixels 412, 313, 422, and 323 is output to the vertical signal line 203. A mixing signal from the pixels 612, 513, 622, 523, 632, and 533 is output to the vertical signal line 303. Similarly, at time t8, the pulse SEL1 in the row selection control line 15 is set to the low level. At time t9, when the pulses RES1 to RES3 in the reset control lines 18, 28, and 38 are set to the high level, the floating diffusion regions for the pixels in the first to sixth rows are reset. At time t10, the pulse SEL1 in the row selection control line 15 is set to the high level. At time t11, when the pulses TX12-2, TX22-2, and TX32-2 in the transfer control lines 12-2, 22-2, and 32-2 are set to the high level, charges in the pixels in even columns and in the second, fourth, and sixth rows are transferred. At that time, a signal from the pixel 214 is output to the vertical signal line 103. A mixing signal from the pixels 414 and 424 is output to the vertical signal line 203. A mixing signal from the pixels 614, 624, and 634 is output to the vertical signal line 303. At time t12, the pulse SEL1 in the row selection control line 15 is set to the low level. The pixel signals which are output to the vertical signal lines 103, 203, and 303 at times t3, t7, and t11 are output to the CDS circuit 4 in FIG. 1. In the photoelectric conversion device 1, the CDS circuit 4 includes an adequate signal holding function, whereby signals in which a different number of pixels are mixed can be obtained at the same time on the basis of the above-described timing.

According to the sixth embodiment, a unit pixel cell 100 has a configuration in which pixel sharing using a matrix having two rows and two columns is used. Therefore, this configuration is suitable for the case in which a color filter of RGB (red-green-blue) Bayer pattern is included. For example, in the case where the pixel 111 corresponds to a red filter, where the pixels 212 and 113 correspond to a green filter, and where the pixel 214 corresponds to a blue filter, green pixels adjacent in the diagonal direction can be mixed on the basis of the timing in FIG. 14.

Reference Embodiment

Figure 15:
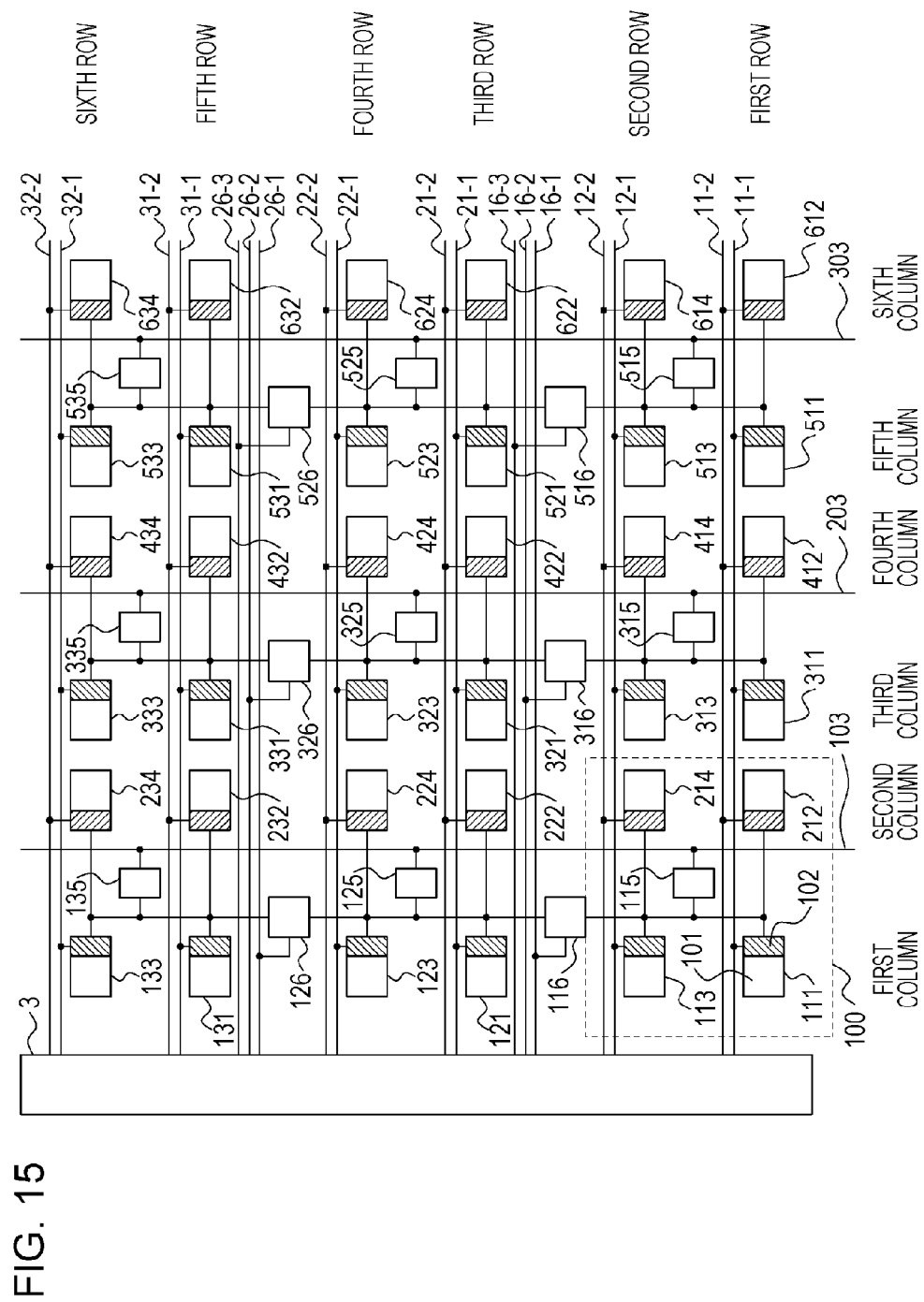
FIG. 15 is a diagram illustrating an exemplary configuration of the pixel unit in FIG. 1.

FIG. 15 is a diagram illustrating an exemplary configuration of the pixel unit 2 (FIG. 1) according to a reference embodiment. In FIG. 15, components designated with identical reference numerals in FIG. 11 are similar to those in FIG. 11. Points in the reference embodiment which are different from those according to the sixth embodiment will be described below. FIG. 15 is different from FIG. 11 in that, for all of the pairs of unit pixel cells 100 adjacent in the column direction, the connection units 116, 126, 316, 326, 516, and 526 each are arranged between the unit pixel cells 100, and that each of the connection units is connected to a different connection control line. For example, the connection sections 116, 316, and 516 are connected to the connection control lines 16-1, 16-2, and 16-3, respectively.

According to the reference embodiment, for all of the pairs of unit pixel cells 100 adjacent in the column direction, a connection unit is disposed between the unit pixel cells 100. Therefore, the difference in influences from parasitic elements caused by non-uniformity in the layout can be reduced. According to the reference embodiment, a connection section disposed in the column direction can be independently controlled. Therefore, a large number of combinations in which signals in the pixel unit 2 are mixed can be provided.

According to the first to sixth embodiments, signals, each of which is obtained by adding a different number of charges accumulated in photoelectric conversion units, can be output at the same time. Therefore, multiple images, each of which has a different signal level corresponding to the brightness, can be obtained at the same time. Thus, the number of reading-outs may be reduced, achieving reading out of signals at high speed.

The first to sixth embodiments are described. The disclosure is not limited to these. For example, an example is described in which a unit pixel has a configuration in which pixel sharing using a unit pixel having a matrix including four rows and one column or including two rows and two columns is employed. However, the disclosure is not limited to this.

The above-described embodiments merely indicate exemplary implementation of the disclosure. These should not cause the technical scope of the disclosure to be interpreted in a limited manner. That is, the disclosure may be embodied in various ways without departing from the technical spirit or the main features of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2013-098499 filed May 8, 2013, which is hereby incorporated by reference herein in its entirety.

What is claimed is:

1. A photoelectric conversion device having pixels arranged in two dimensions, each of the pixels having a photoelectric conversion unit, the photoelectric conversion device comprising:
   a first pixel group configured to have a plurality of pixels arranged in a predetermined direction and formed into a plurality of first subgroups of output nodes, the output nodes in each of the plurality of first subgroups being connected together;
   a second pixel group configured to have a plurality of pixels arranged in the predetermined direction and formed into a plurality of second subgroups of output nodes, the output nodes in each of the plurality of second subgroups being connected together;
   a first connection section configured to switch between electrical connection and electrical non-connection between the output nodes in one of the first subgroups and the output nodes in another one of the first subgroups; and
   a second connection section configured to switch between electrical connection and electrical non-connection between the output nodes in one of the second subgroups and the output nodes in another one of the second subgroups,
   wherein the number of output nodes in the plurality of first subgroups which are electrically connected to one another by the first connection section is different from the number of output nodes in the plurality of second subgroups which are electrically connected to one another by the second connection section, and
   a period when the first connection section allows the electrical connection between the output nodes in one of the first subgroups and the output nodes in another one of the first subgroups, and a period when the second connection section allows the electrical connection between the output nodes in one of the second subgroups and the output nodes in another one of the second subgroups overlap,
   wherein the first pixel group and the second pixel group are provided in different columns.

2. The photoelectric conversion device according to claim 1, wherein the first connection section includes a plurality of connection units, the second connection section includes a plurality of connection units, and any of the plurality of connection units included in the first connection section and any of the plurality of connection units included in the second connection section establish connection in accordance with a signal in an identical connection control line.

3. The photoelectric conversion device according to claim 1, wherein the first connection section adds charges of signals of an identical color.

4. A photoelectric conversion device having pixels arranged in two dimensions, each of the pixels having a photoelectric conversion unit, the photoelectric conversion device comprising:
   a first pixel group configured to have a plurality of pixels arranged in a predetermined direction and formed into a plurality of first subgroups of output nodes, the output nodes in each of the plurality of first subgroups being connected together;
   a second pixel group configured to have a plurality of pixels arranged in the predetermined direction and formed into a plurality of second subgroups of output nodes, the output nodes in each of the plurality of second subgroups being connected together;
   a first connection section configured to control electrical connections of the output nodes in the first subgroups; and
   a second connection section configured to control electrical connections of the output nodes in the second subgroups,
   wherein the number of output nodes in the plurality of first subgroups which are electrically connected to one another by the first connection section is different from the number of output nodes in the plurality of second subgroups which are electrically connected to one another by the second connection section,
   wherein the first and second pixel groups have a plurality of unit pixel cells,
   wherein each of the unit pixel cells includes
   a plurality of photoelectric conversion units and a plurality of transfer units, each of the plurality of transfer units being provided for a corresponding one of the plurality of photoelectric conversion units, a signal reading out unit that reads out a signal generated in the photoelectric conversion unit, and transferring a charge in the corresponding photoelectric conversion unit to an input node of the signal reading out unit, and the device includes
   a first signal line to which a signal of the first pixel group is read out, and
   a second signal line to which a signal of the second pixel group is read out, and wherein a signal obtained by adding signals from the plurality of pixels included in the first pixel group is output to the first signal line, and, at the same time, a signal obtained by adding signals from the plurality of pixels included in the second pixel group is output to the second signal line.

5. The photoelectric conversion device according to claim 4, wherein the signal reading out unit is provided for and shared by the plurality of photoelectric conversion units included in the same unit pixel cell.

\* \* \* \* \*